(12) United States Patent
Zhang et al.

(10) Patent No.: US 8,602,604 B2
(45) Date of Patent: Dec. 10, 2013

(54) EXTRUDED WIDE ANGLE LENS FOR USE WITH A LED LIGHT SOURCE

(75) Inventors: John X. Zhang, Concord, CA (US); Christopher H. Lowery, Tracy, CA (US)

(73) Assignee: Lunera Lighting, Inc., Redwood City, CA (US)

( * ) Notice: Subject to any disclaimer, the term of this patent is extended or adjusted under 35 U.S.C. 154(b) by 232 days.

(21) Appl. No.: 12/904,551

(22) Filed: Oct. 14, 2010

(65) Prior Publication Data
US 2012/0092856 A1    Apr. 19, 2012

(51) Int. Cl.
*F21V 3/00* (2006.01)

(52) U.S. Cl.
USPC ..................... 362/311.02; 362/257

(58) Field of Classification Search
USPC ............... 362/311.01–311.05, 543–549, 555, 362/800, 249.01–249.03, 147, 362/217.01–217.02, 227, 235
See application file for complete search history.

(56) References Cited

U.S. PATENT DOCUMENTS

| | | | |
|---|---|---|---|
| 7,559,672 B1 * | 7/2009 | Parkyn et al. | 362/244 |
| 2011/0235338 A1 * | 9/2011 | Chen et al. | 362/311.02 |

* cited by examiner

*Primary Examiner* — Donald Raleigh
(74) *Attorney, Agent, or Firm* — North Weber & Baugh LLP

(57) ABSTRACT

This is directed to a lens for use with a LED light source. The lens can be placed on a top surface of a light fixture to direct light emitted by a LED module at a wide angle relative to the top surface of the fixture. The lens can include an elongated trench in which several LED light sources can be placed in a line such that light emitted within the trench is re-directed by the lens. The lens can include one or more knobs extending over the trench to facilitate diverting emitted light in a more lateral direction, as opposed to vertical direction. In some cases, the lens can be constructed using an extrusion process by which a lens having a constant cross-section allowing for a wide angle radiation pattern is provided.

14 Claims, 14 Drawing Sheets

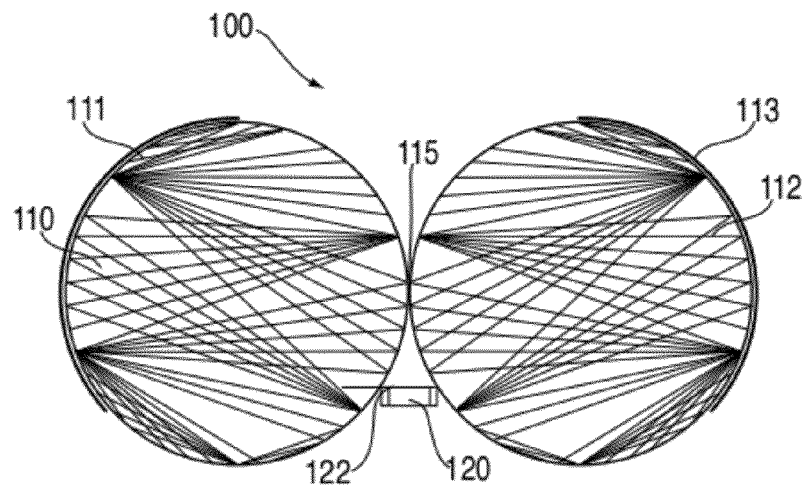
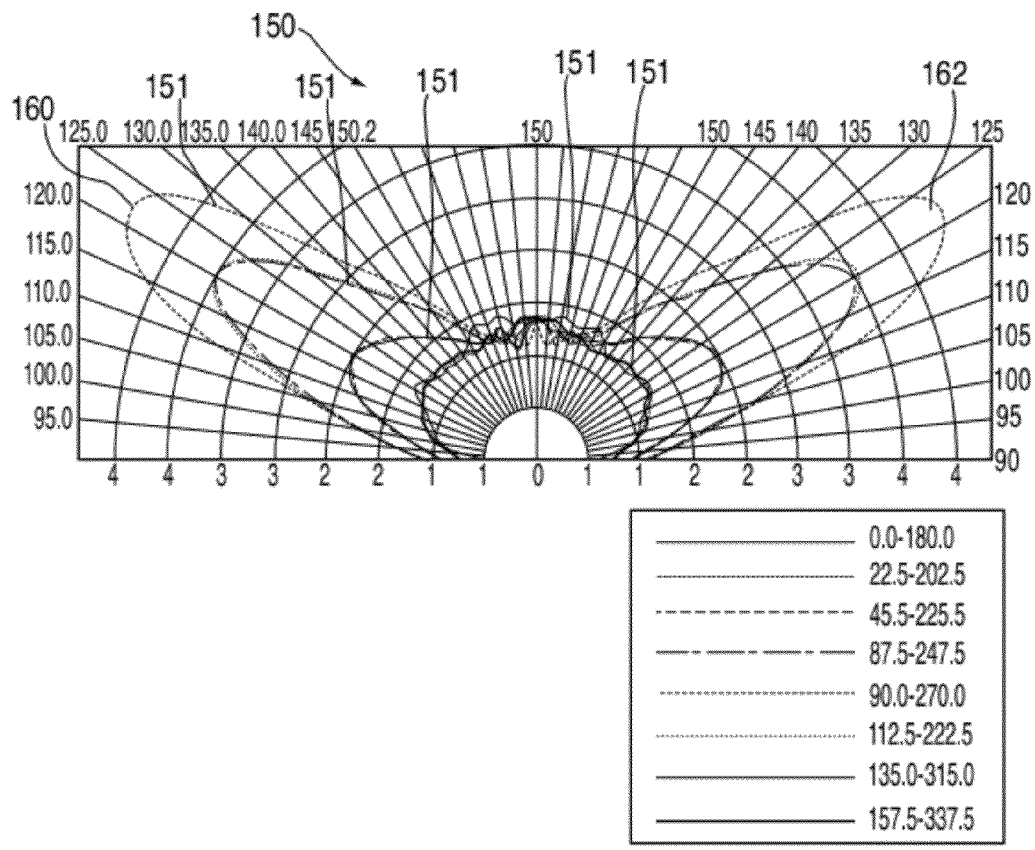
FIG. 1A
FIG. 1B

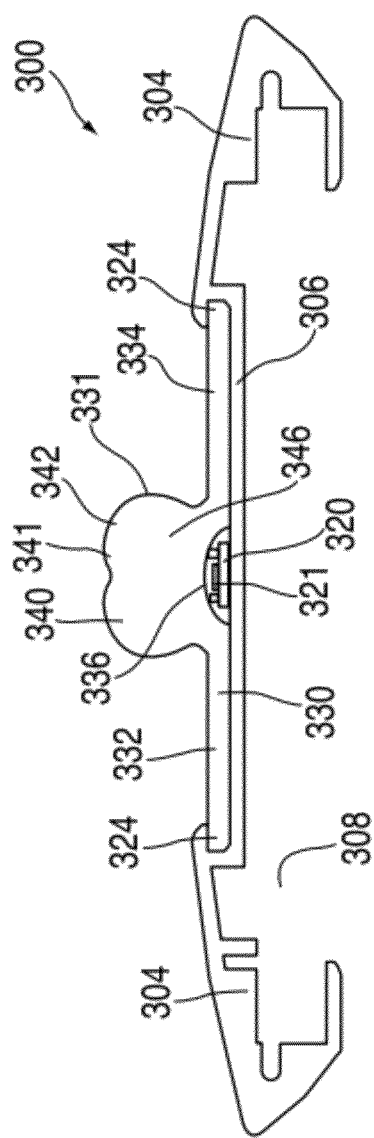
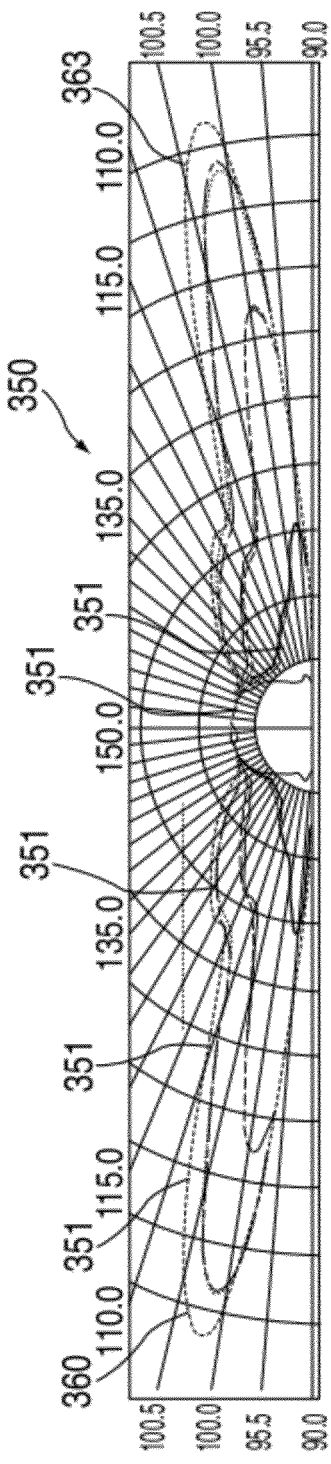

US 8,602,604 B2

EXTRUDED WIDE ANGLE LENS FOR USE WITH A LED LIGHT SOURCE

BACKGROUND

A LED light source can be constructed from a LED module placed in a fixture having a lens. The lens can serve to direct light from the LED module to an environment in which the LED light source is placed. A LED module typically distributes light in a Lambertian radiation pattern. In other words, the majority of the light emitted by the LED module is within a half angle of 60 degrees from the vertical axis of an emitting face of the LED module. This illumination pattern, however, may not be desirable for ceiling light fixtures, or other fixtures for which it is desirable that light is distributed using a wide angle pattern. In particular, this light pattern may not be desirable for LED modules provided on a top surface of a hanging fixture, where the LED modules illuminate a ceiling. Instead, it may be desirable for light emitted by the LED modules to be shifted such that the emitted light falls in a region substantially near a plane of the emitting face of the LED module (e.g., in a wide angle).

SUMMARY

This is directed to wide-angle lens for use with a LED light source.

A light fixture can include a LED light source. Because light provided by a LED light source may typically have a limited distribution, the light fixture can include a lens for re-distributing emitted light to a wide angle. The lens can include an elongated structure having a primary lens surface opposite a secondary lens surface, where the LED light source is placed adjacent to the primary light source. The elongated structure can include at least two distinct protrusions extending from a planar section, where the protrusions re-direct light emitted from the LED light source to a wide angle. The two distinct protrusions can form part of a twin lens. In particular, the lens can be constructed to use the total internal reflection (TIR) to maximize the total efficiency of the lens. The elongated structure can include a notch in the outer surface of the lens (e.g., in the secondary lens surface) between the protrusions, such that the notch is opposite the LED light source.

In some embodiments, the primary lens surface can be constructed in a trench extending through the elongated structure of the lens. In particular, the trench can be sized such that the LED light source can be placed or retained in the trench, and can direct light directly to the primary lens surface.

The lens can be constructed using different approaches. In some cases, the lens can be constructed using an extrusion process. In particular, a die having a cross-section corresponding to the elongated structure can be provided, and material having desirable optical properties can be extruded through the die. In some cases, the resulting lens can be processed to finalize or refine the optical performance of the lens.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 1A is a schematic sectional view of a lens assembly for redistributing light;

FIG. 1B is a graph of an illustrative light distribution provided by the lens assembly of FIG. 1A;

FIG. 3A is a sectional view of an illustrative light fixture having a lens providing a light distribution corresponding to design requirements in accordance with some embodiments of the invention;

FIG. 3B is a graph of an illustrative light distribution set by design requirements in accordance with some embodiments of the invention;

DETAILED DESCRIPTION

Figure 2A:
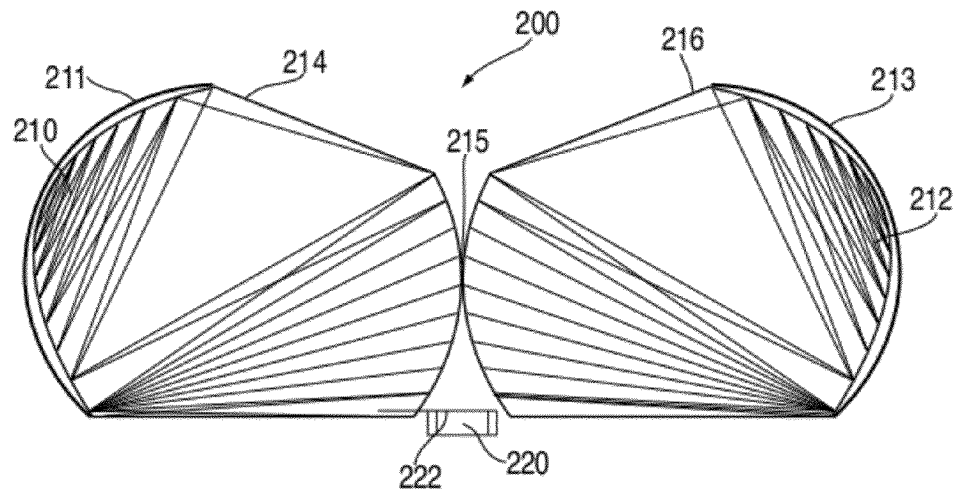
FIG. 2A is a schematic sectional view of another lens assembly for redistributing light.

This is directed to a wide-angle lens for shifting the distribution of light emitted by a LED light source. In particular, this is directed to a lens operative to re-direct light from a tight angle to a wide angle relative to a normal to a light emitting surface of a LED light source.

A light fixture using a LED module as a light source can be mounted in several different manners. In some cases, a light fixture can be mounted to a ceiling, mounted under a counter, as part of a desk light, a wall sconce, a wall wash, as a surface mounted light fixture, or combinations of these. To ensure that light emitted from the fixture is distributed in a manner that effectively illuminates a space and provides an even lighting pattern, the distribution pattern of light emitted by a LED module of the fixture can be tailored for a type of light fixture or for a particular environment.

Different approaches can be used to change a distribution pattern of light emitted by a LED module. FIG. 1A is a schematic sectional view of a lens assembly for redistributing light. FIG. 1B is a graph of an illustrative light distribution provided by the lens assembly of FIG. 1A. Lens assembly 100 can be constructed by placing several distinct lens 110 and 112 adjacent to each other. In particular, lens 110 and 112 can include ½" diameter acrylic lens spaced at 1" apart such that external surface 111 of lens 110 and external surface 113 of lens 112 come into contact in region 115. The individual lens of assembly 100 can have any suitable shape including, for example, a cross-section corresponding to a portion of a circle or of an oval (e.g., a portion of a circle having a ½" diameter).

Lens assembly 100 can include LED module 120 operative to emit light towards region 115 of lens 110 and 112. Although module 120 can typically emit light in a substantially narrow distribution (e.g., a majority of emitted light is restricted to a region perpendicular to light emitting face 122 of LED module 120), each of lens 110 and 112 can re-direct light emitted by the module to shift an angle at which a maximum intensity of the light is emitted.

Graph 150 shown in FIG. 1B is an illustrative distribution of light emitted by lens assembly 100. In particular, the distribution can include several curves 151 depicting the intensity of light emitted by lens assembly 100 from different angles. The light intensity distribution shown in FIG. 1B includes two distinct peaks at specific angle relative to a vertical line extending from light emitting face 122, indicating that lens assembly 100 is effective to "flatten" the light distribution. In particular, curves 151 of the distribution include peak 160 corresponding to a shift in light intensity distribution resulting from lens 110, and peak 162 corresponding to a shift in light intensity distribution resulting from lens 112. As shown in graph 150, peaks 160 and 162 are approximately 125 degrees from a nadir orientation 102 (e.g., an orientation along the line normal to the light emitting face, but directed away from the light emitting face). While this may be an improvement over a LED module with no lens assembly, the angles at which the maximum light intensity is provided may not be sufficiently wide for some applications. For example, it may be desirable to provide a distribution in which the maximum light intensity is provided at less than 110 degrees from nadir orientation 102 (e.g., 105 degrees).

Figure 2B:
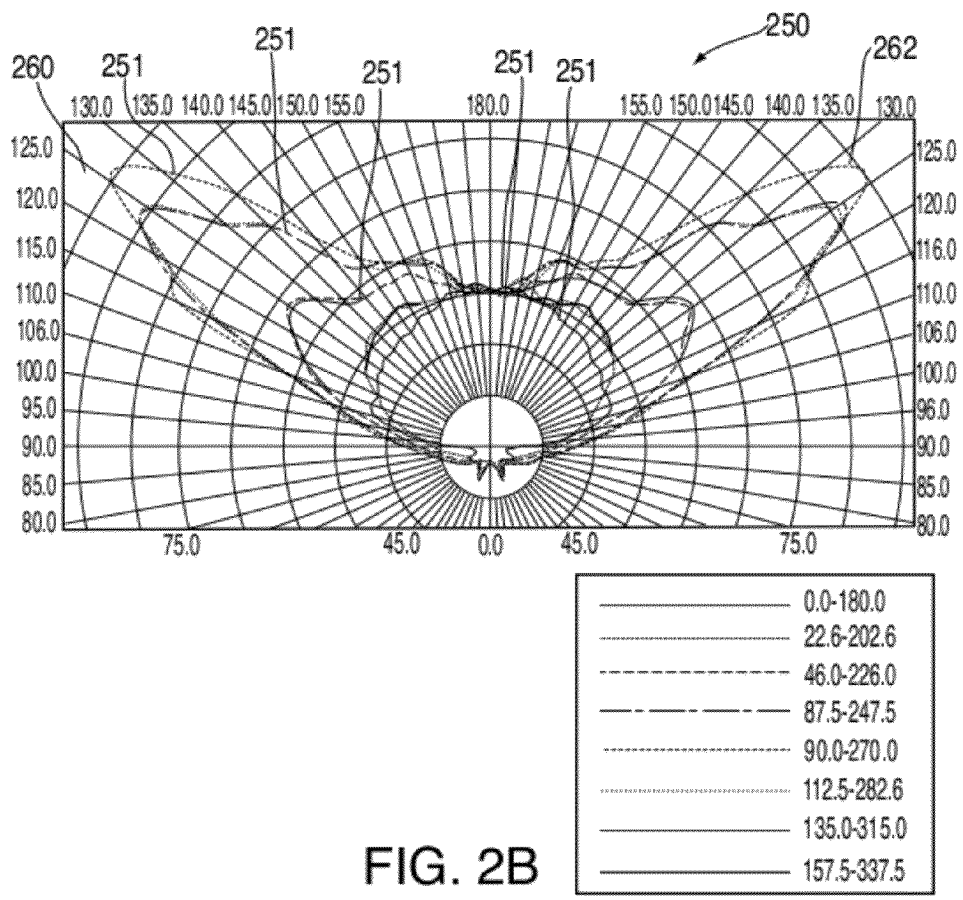
FIG. 2B is a graph of an illustrative light distribution provided by the lens assembly of FIG. 2A.

FIG. 2A is a schematic sectional view of another lens assembly for redistributing light. FIG. 2B is a graph of an illustrative light distribution provided by the lens assembly of FIG. 2A. Lens assembly 200 can be constructed by placing several distinct lens 210 and 212 adjacent to each other. In particular, lens 210 and 212 can include modified ½" diameter acrylic lens spaced at 1" apart such that external surface 211 of lens 210 and external surface 213 of lens 212 come into contact in region 215. The individual lens of assembly 200 can have any suitable shape including, for example, a cross-section corresponding to a portion of the cross-section of lens 110 and 112 (FIG. 1). For example, lens 210 can be constructed by removing a portion of lens 110 to create flat surface 214, and lens 212 can be constructed by removing a portion of lens 112 to create flat surface 216.

Removing material from each lens can modify the distribution of light emitted by the lens assembly. Graph 250 shown in FIG. 2B is an illustrative distribution of light emitted by lens assembly 200. In particular, the distribution can include several curves 251 depicting the intensity of light emitted by lens assembly 200 from different angles. The light intensity distribution shown in FIG. 2B includes two distinct peaks at a specific angle relative to a vertical line extending from light emitting face 222, indicating that lens assembly 200 is effective to "flatten" the light distribution. In particular, curves 251 of the distribution include peak 260 corresponding to a shift in light intensity distribution resulting from lens 210, and peak 262 corresponding to a shift in light intensity distribution resulting from lens 212. As shown in graph 250, peaks 260 and 262 are approximately 125 degrees from vertical, similar to the peaks of the light intensity distribution corresponding to lens assembly 100. In contrast with curves 151 graph 150, however, the curves 251 of graph 250 can include different shapes indicating variations of intensity in emitted light at angles other than the angle of maximum light intensity.

Figure 3C:
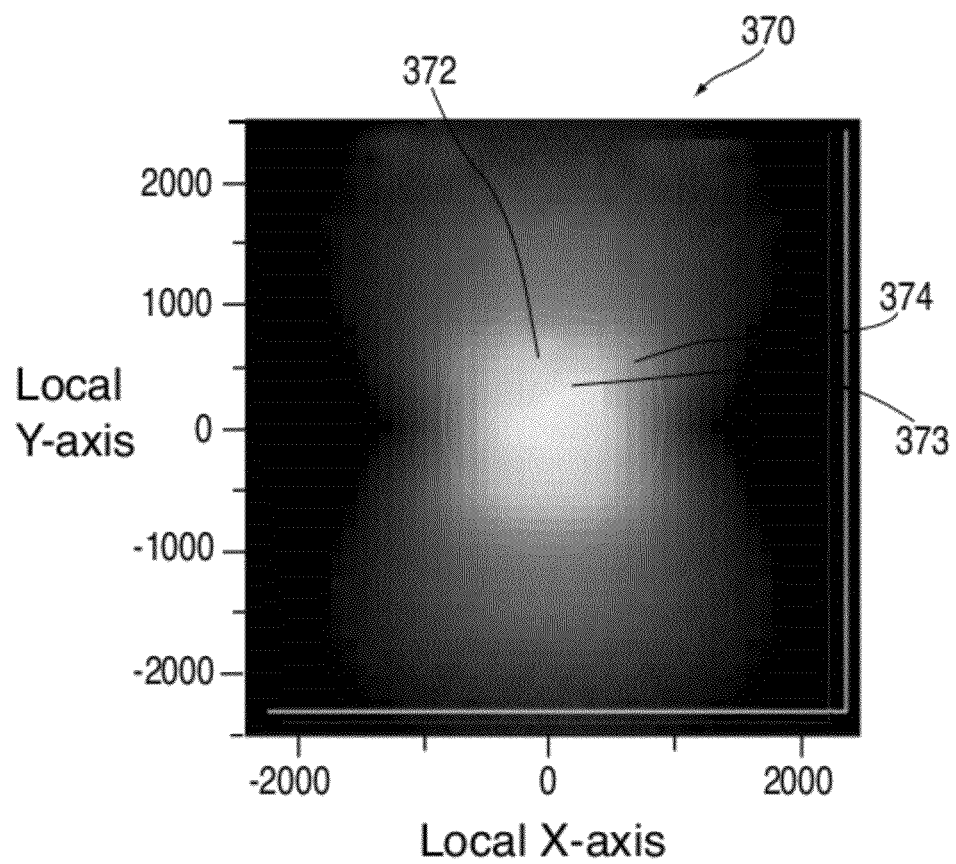
FIG. 3C is an image of an illustrative near field rendering of light provided on a ceiling by a light source set by design requirements in accordance with some embodiments of the invention.

The distribution of light provided by lens assemblies 100 and 200, however, may shift emitted light by an amount that may be less than a desired amount corresponding to design requirements. FIG. 3A is a sectional view of an illustrative light fixture having a lens providing a light distribution corresponding to design requirements in accordance with some embodiments of the invention. FIG. 3B is a graph of an illustrative light intensity distribution set by design requirements in accordance with some embodiments of the invention. FIG. 3C is an image of an illustrative light pattern set by design requirements in accordance with some embodiments of the invention.

Fixture 300, shown in FIG. 3A, can include frame 302 operative to retain lighting components such as, for example, a light source, lens, diffuser, or combinations of these. Frame 302 can include sidewalls 304 extending from a bottom surface of plate 306 to form concavity 308 in which a primary light source can be provided (not shown). Light emitted from within concavity 308 can illuminate a large region extending below frame 300, for example when frame 300 is provided as a suspended ceiling fixture.

Because of sidewalls 304, however, a light source positioned within concavity 308 may not emit light above frame 300. When fixture 300 is suspended from a ceiling, this may create a dark region or cave-effect above the fixture. To reduce this effect, fixture 300 can include light source 320 and lens 330 positioned on an upper surface of plate 306. Lens 330 can be retained in the fixture by notches 324 at an interface between a top surface of plate 306 and side walls 304. In some cases, light source 320 can include a module placed in concavity 308 and at least partially piped through plate 306 to the top surface of the fixture. For example, plate 306 can be transparent. Alternatively, light source 320 can include a distinct light module placed on a top surface of plate 306 and dedicated to providing light to regions above frame 300. In some cases, light source 320 can include one or more LED modules. The LED modules can be disposed in any suitable manner, or can include LED packages disposed in any suitable manner including, for example, along an axis (e.g., in a line).

Lens 330 can include plate elements 332 and 334 extending in a plane that is substantially co-planar with a plane of plate 306, or with a plane of light emitting surface 321 of light source 320 (e.g., both light emitting surface 321 and plate 306 may be co-planar). In some embodiments, a top surface of plate elements 332 and 334 can be in the same plane as the light emitting surface of light source 320. Alternatively, a bottom surface of plate elements 332 and 334 can be positioned adjacent to or in contact with a top surface of plate 306. Plate elements 332 and 334 can each extend from notches 324 towards light source 320, such that light source 320 separates the plate elements. Plate elements 332 and 334 may serve a mechanical purpose for securing lens 330 instead of or in addition to an optical purpose. For example, light emitted by light source 320 may not be directed by plate elements 332 and 334.

Lens 330 can include knob 340 extending from plate element 332, and knob 342 extending from plate element 334 such that knobs 340 and 342 share a common region 346 along an axis extending from light emitting surface 321 of light source 320. In some cases, knobs 340 and 342, forming a protrusion from plates 332 and 334, can interface or connect near a centerline of light source 320. Plate elements 332 and 334, and knobs 340 and 342 can combine to form body 331 of lens 330. in some cases, lens 330 may be limited to body 331, and not include plates 332 and 334. Lens 330 or body 331 can be symmetrical relative to a plane passing through a centerline of the body (e.g., a centerline of trench 336) and normal to the plane of light emitting surface 321.

Each of knobs 340 and 342 can be shaped such that light emitted from light source 320 is re-directed or re-distributed laterally (e.g., away from the vertical axis extending from light emitting surface 321). For example, lens 330 can include indentation 341 between knobs 340 and 342 along an outer surface of the lens to direct light away from the vertical axis. As another example, lens 330 can include trench 336 defined between knobs 340 and 342 and light source 320 such that light emitted by the light source can be captured and redirected by lens 330. Trench 336, which provides a primary lens surface for lens 330, can have any suitable size including, for example, a size determined from dimensions of light source 320, or from optical requirements of lens 330. In some cases, trench 336 can be defined such that light source 320 fits entirely within trench 336. In other cases, the shape of trench 336 can be selected such that most or all light provided by light source 320 is incident to the surface of trench 336 at an angle of less than a critical angle from an axis normal to a plane tangent to the surface of the trench (e.g., 42 degrees). This may ensure that internal reflection within the lens is minimized. Accordingly, the surface of trench 336 can include internal features (e.g., steps or roughened surface area) for ensuring a proper incident angle of light on the trench surface.

Knobs 340 and 342 can have any suitable shape for redirecting light emitted by light source 320. For example, knobs 340 and 342, which can be the same or different, can include bulbous cross-sections selected to direct light away from a vertical axis and towards a horizontal axis. In particular, knobs 340 and 342 can be defined to provide a specific light intensity distribution such as, for example, the distribution depicted in graph 350 (FIG. 3B). In some cases, knobs 340 and 342 can define hollow regions (e.g., define outer walls) such that light can reflect within boundaries provided by the external surfaces of the knobs (e.g., trench 336 extends to the external surfaces of the knobs). Alternatively, knobs 340 and 342 can be substantially filled in, such that material fills the space between the external surfaces of the knobs and trench 336. The external surface of knobs 340 and 342 can serve as a secondary lens surface for lens 330.

As shown in FIG. 3B, individual curves 351 of graph 350 can illustrate a distribution of light emitted by a lens assembly corresponding to design requirements. The light intensity distribution of graph 350 can include two distinct peaks at specific angles relative to a vertical line extending from a light emitting face. In particular, curves 351 of the distribution can include peak 360 corresponding to a shift in light intensity distribution resulting from a first knob of lens 330 (e.g., knob 340), and peak 362 corresponding to a shift in light intensity distribution resulting from resulting from a second knob of lens 330 (e.g., knob 342). As shown in graph 300, peaks 360 and 362 are approximately 105 degrees from vertical, or 20 degrees further from vertical than the peaks provided by lens assemblies 100 (FIG. 1A) and 200 (FIG. 2A). Accordingly, lens 330 can re-direct emitted light from a small or tight angle to a wide angle.

Representation 370, shown in FIG. 3C, depicts a near field rendering of light provided on a ceiling by a light source using lens 330. Representation 370 can include central light region 372 having a periphery 374. To provide a uniform light distribution on the ceiling, representation 370 can include a gradient of light between center 373 of central light region 372 and periphery 374. In particular, central light region 372 may be continuous and not include any dark breaks.

Figure 4A:
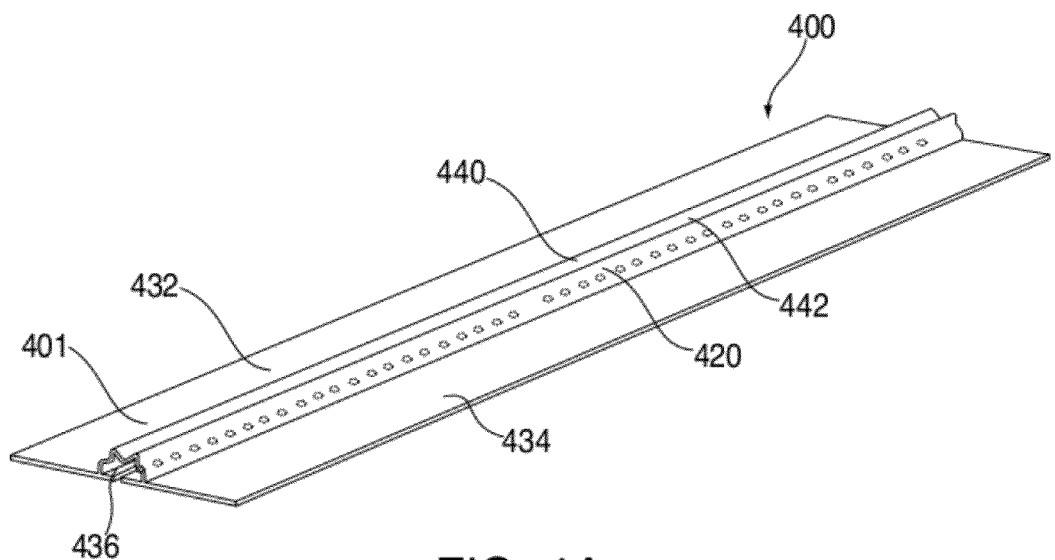
FIG. 4A is a perspective view of an illustrative lens in accordance with some embodiments of the invention.
Figure 4B:
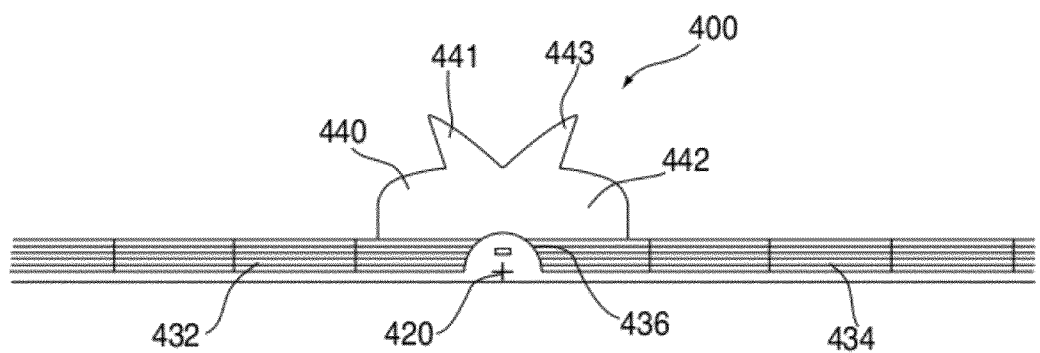
FIG. 4B is a sectional view of the lens of FIG. 4A in accordance with some embodiments of the invention.

Several different lens assemblies can be used to create a light intensity distribution substantially matching the distribution of FIG. 3B. FIG. 4A is a perspective view of an illustrative lens in accordance with some embodiments of the invention, and FIG. 4B is a sectional view of the lens of FIG. 4A in accordance with some embodiments of the invention. Lens 400 can include plate elements 432 and 434 extending from knobs 440 and 442. The lens can have a substantially rectangular shape, where knobs 440 and 442 extend substantially along a long axis of the lens. Lens 400 can include trench 436, which provides a primary lens surface for lens 400, extending between plate elements 432 and 434 and underneath knobs 440 and 442 for substantially the entire length of lens 400 (e.g., for the length of elongated body 401). To illuminate the entirety of lens 400, light source 420 can extend substantially through the entirety of trench 436. For example, light source 420 can include a LED module having a series of LED packages extending along an axis, or a series of LED modules extending along an axis, where the axis corresponds to the shape of trench 436. In some cases, lens 400 can include caps at each end of trench 436 to prevent light from leaking out through the ends of the lens and adversely affecting the optical performance of the lens.

Figure 4C:
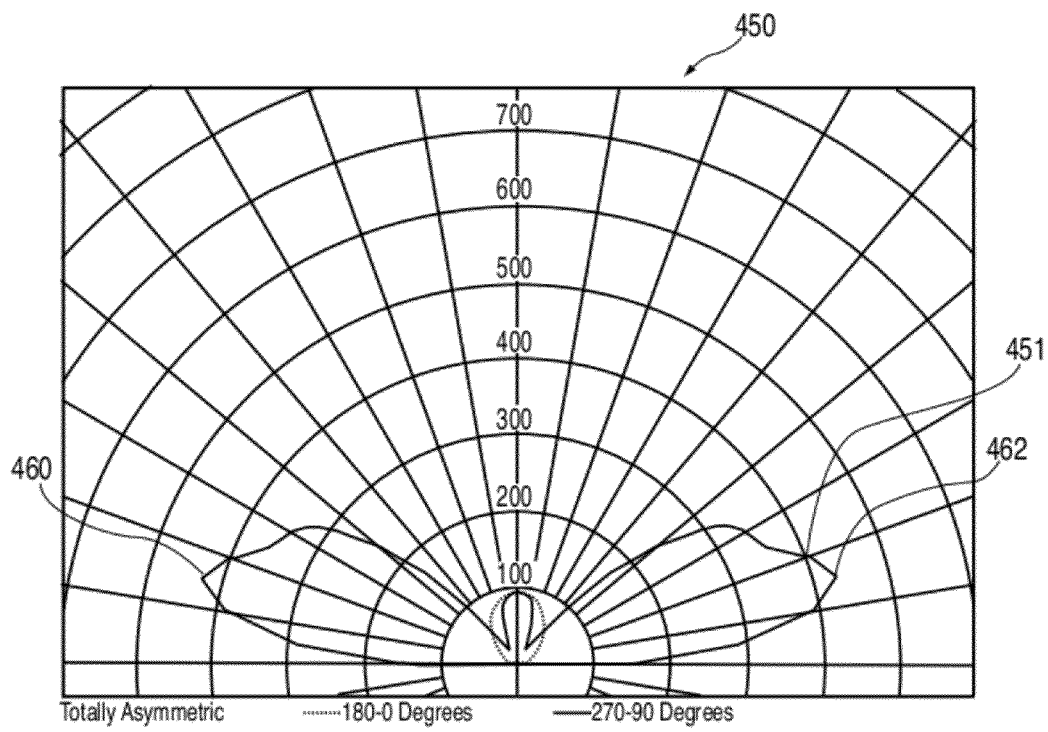
FIG. 4C is a graph of an illustrative light distribution provided using the lens of FIG. 4A in accordance with some embodiments of the invention.
Figure 4D:
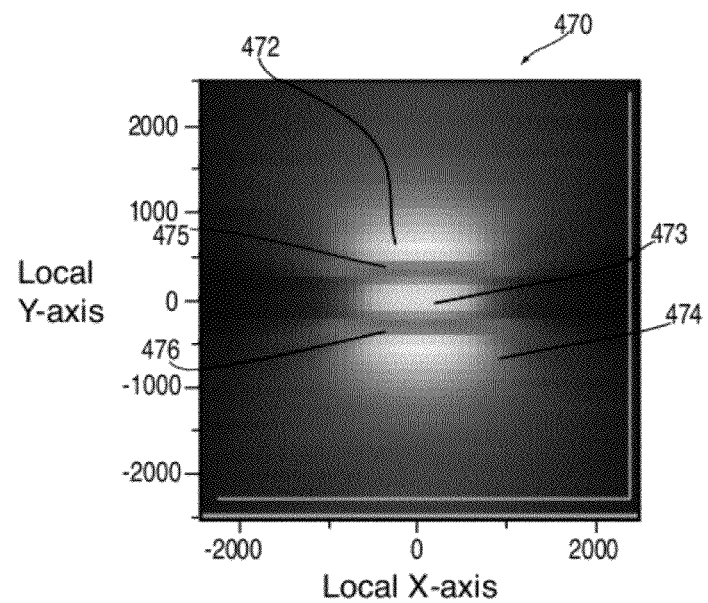
FIG. 4D is an image of an illustrative near field rendering of light provided on a ceiling by a light source using the lens of FIG. 4A in accordance with some embodiments of the invention.

Knobs 440 and 442 can have any suitable feature for directing light in a desired manner. For example, knob 440 can include peak 441, and knob 442 can include peak 443 extending substantially vertically from a plane of plate 432. The external surface of knobs 440 and 442 can serve as a secondary lens surface for lens 400. Using lens 400, light emitted by light source 420 can be distributed in a manner depicted by curve 451 of graph 450, shown in FIG. 4C. Curve 451 can include distinct peaks 460 and 462, each corresponding to knobs 440 and 442, respectively, angled away from an axis vertical to the light emitting surface of the light source. Representation 470, shown in FIG. 4D, depicts a near field rendering of light provided on a ceiling by a light source using lens 400. Representation 470 can include central light region 472 having a periphery 474. Due to the shape of lens 400, however, a gradient of light between center 473 of central light region 472 and periphery 474 can include a discontinuity. In particular, central light region 472 may be discontinuous and include dark bands 475 and 476 extending along a length of central light region 472. It may be desirable, however, to provide a rendering that minimizes, smoothes out, or eliminates the discontinuity.

Figure 5A:
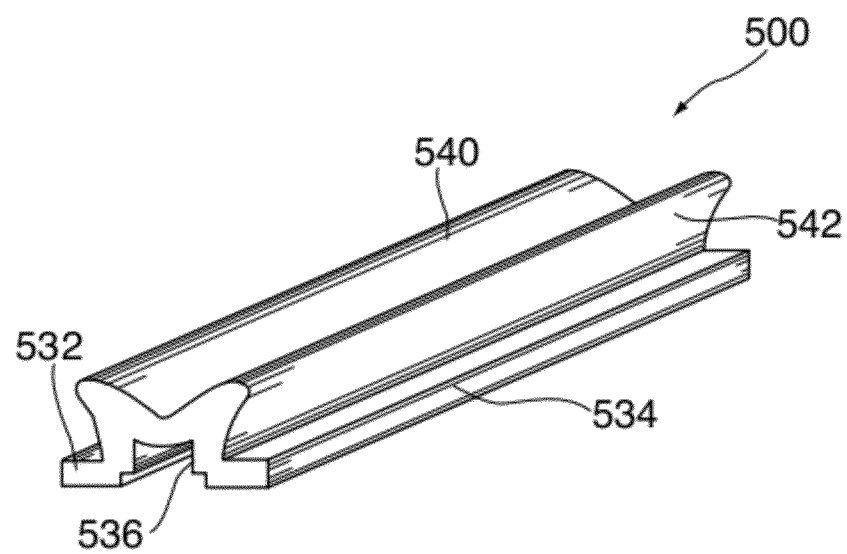
FIG. 5A is a perspective view of another illustrative lens in accordance with some embodiments of the invention.
Figure 5B:
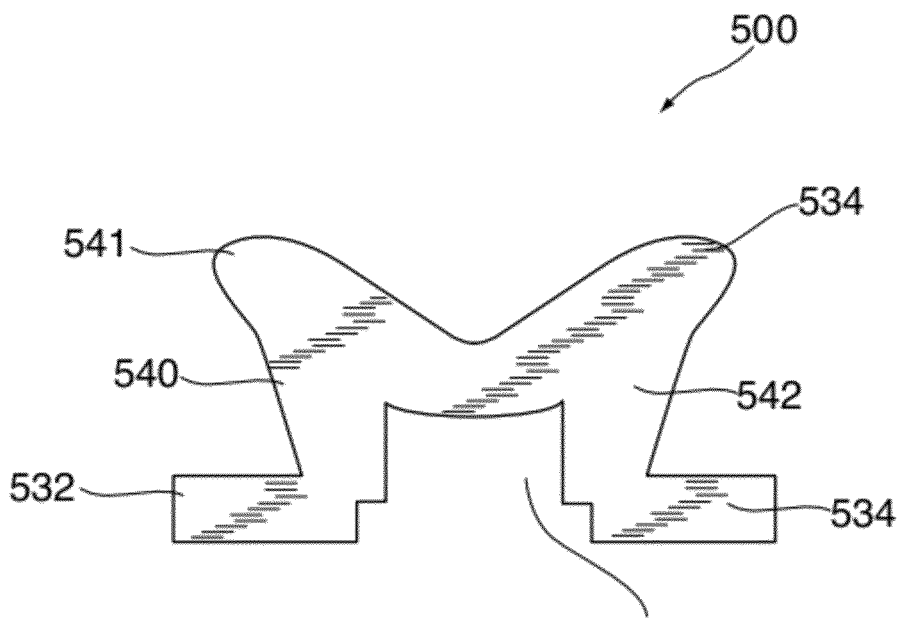
FIG. 5B is a sectional view of the lens of FIG. 5A in accordance with some embodiments of the invention.
Figure 5C:
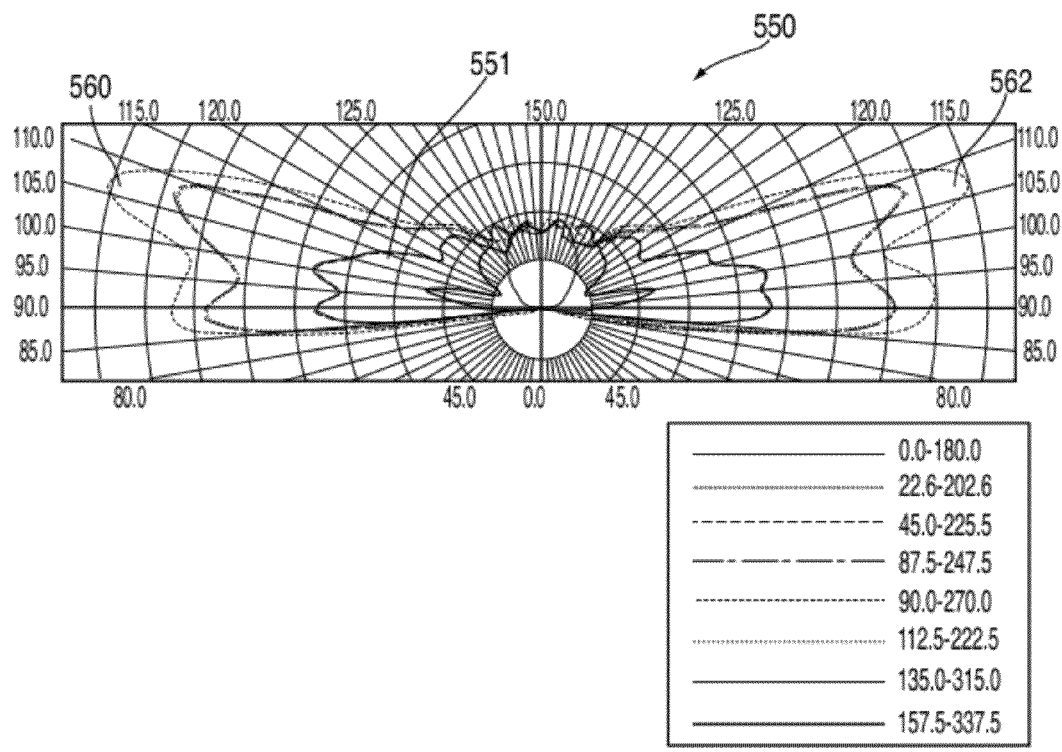
FIG. 5C is a graph of an illustrative light distribution provided using the lens of FIG. 5A in accordance with some embodiments of the invention.
Figure 5D:
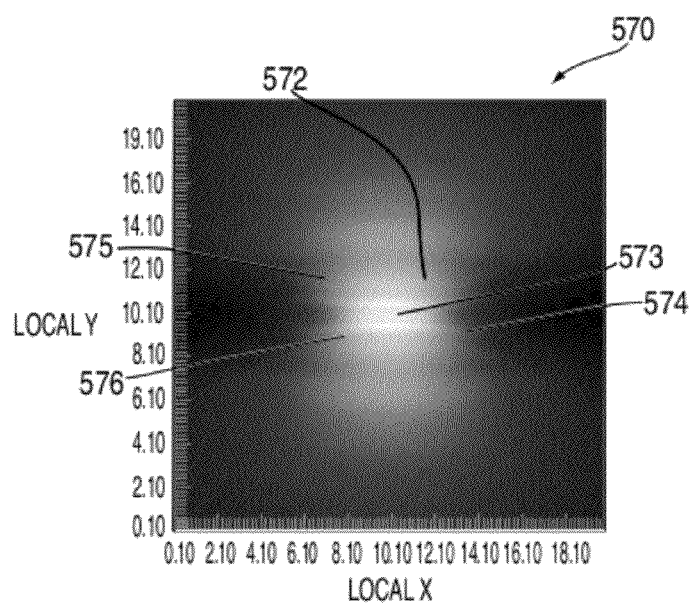
FIG. 5D is an image of an illustrative near field rendering of light provided on a ceiling by a light source using the lens of FIG. 5A in accordance with some embodiments of the invention.
Figure 5E:
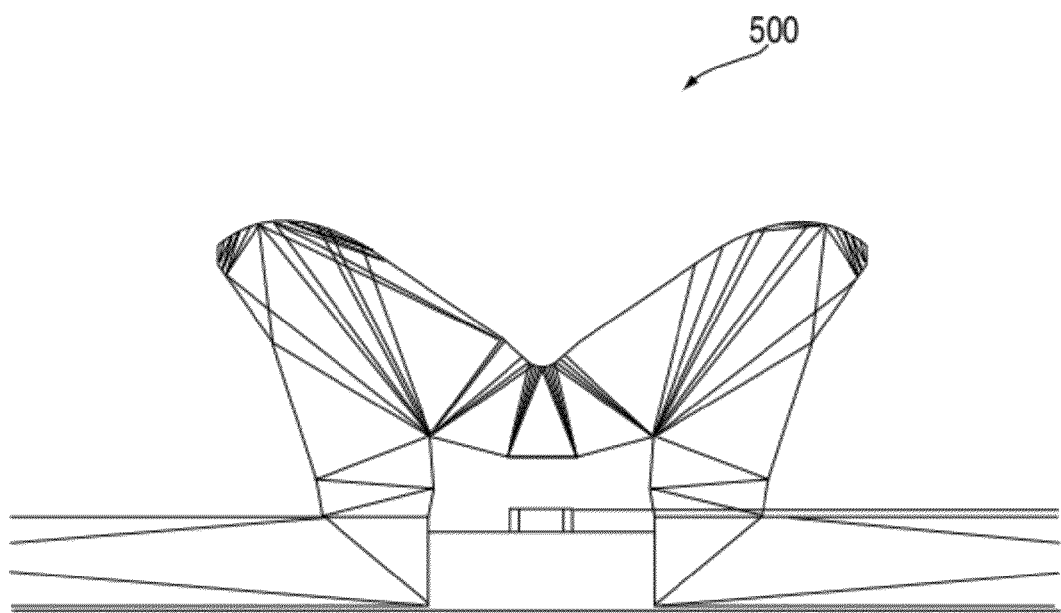
FIG. 5E is a sectional view of the lens of FIG. 5A in accordance with some embodiments of the invention.

FIG. 5A is a perspective view of another illustrative lens in accordance with some embodiments of the invention, and FIGS. 5B and 5E are sectional views of the lens of FIG. 5A in accordance with some embodiments of the invention. Lens 500 can include plate elements 532 and 534 extending from knobs 540 and 542. The lens can have a substantially rectangular shape, where knobs 540 and 542 extend substantially along a long axis of the lens. Lens 500 can include trench 536, which provides a primary lens surface for lens 500, extending between plate elements 532 and 534 for receiving a light source, similar to the corresponding components of lens 400 (FIGS. 4A and 4B). In some cases, lens 500 can include caps at each end of trench 536 to prevent light from leaking out through the ends of the lens and adversely affecting the optical performance of the lens.

Knobs 540 and 542 can have any suitable feature for directing light in a desired manner. For example, knob 540 can include tip 541, and knob 542 can include tip 543. The external surface of knobs 540 and 542 can serve as a secondary lens surface for lens 500. Light emitted by a light source can be distributed in a manner depicted by curve 551 of graph 550, shown in FIG. 5C. Curve 551 can include distinct peaks 560 and 562, each corresponding to knobs 540 and 542, respectively, angled away from an axis vertical to the light emitting surface of the light source. Representation 570, shown in FIG. 5D, depicts a near field rendering of light provided on a ceiling by a light source using lens 500. Representation 570 can include central light region 572 having a periphery 574. Due to the shape of lens 500, however, a gradient of light between center 573 of central light region 572 and periphery 574 can include a discontinuity. In particular, central light region 572 may be discontinuous and include dark bands 575 and 576 extending along a length of central light region 572. The particular dark bands 575 and 576 can be smaller than bands 475 and 476 (FIG. 4), indicating that the lens 500 provides a better light distribution than that of lens 400 (FIG. 4). It may be desirable, however, to provide a rendering that minimizes, smoothes out, or eliminates the discontinuity.

Figure 6A:
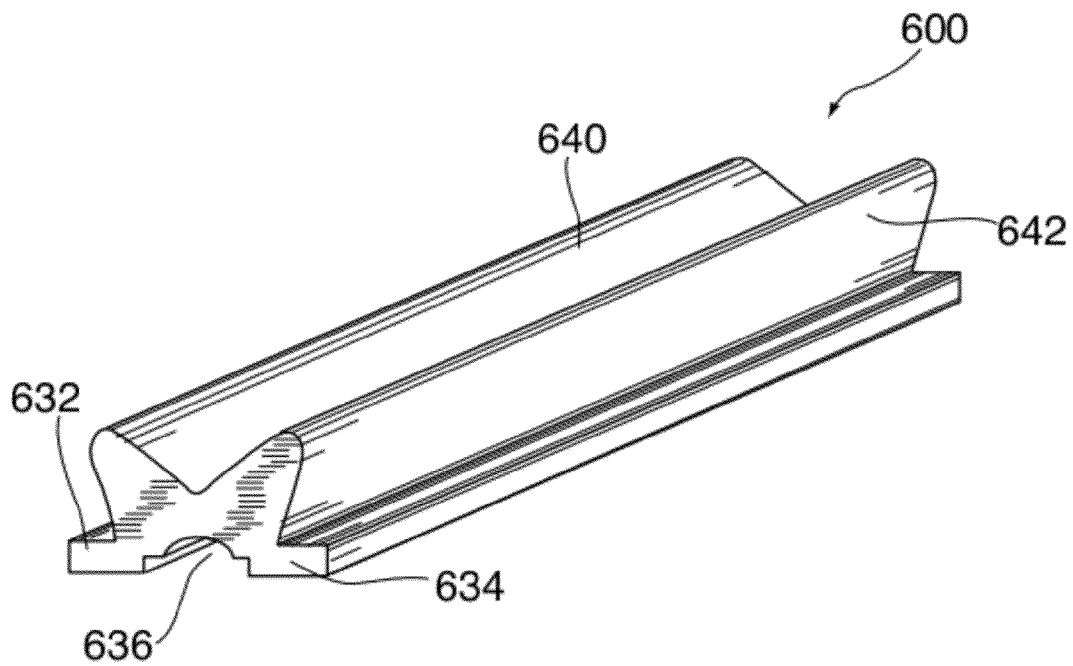
FIG. 6A is a perspective view of still another illustrative lens in accordance with some embodiments of the invention.
Figure 6B:
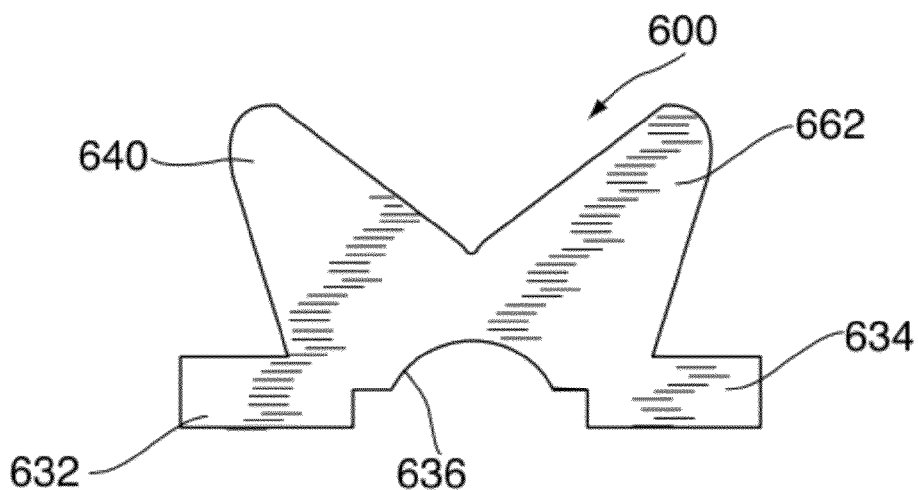
FIG. 6B is a sectional view of the lens of FIG. 6A in accordance with some embodiments of the invention.
Figure 6C:
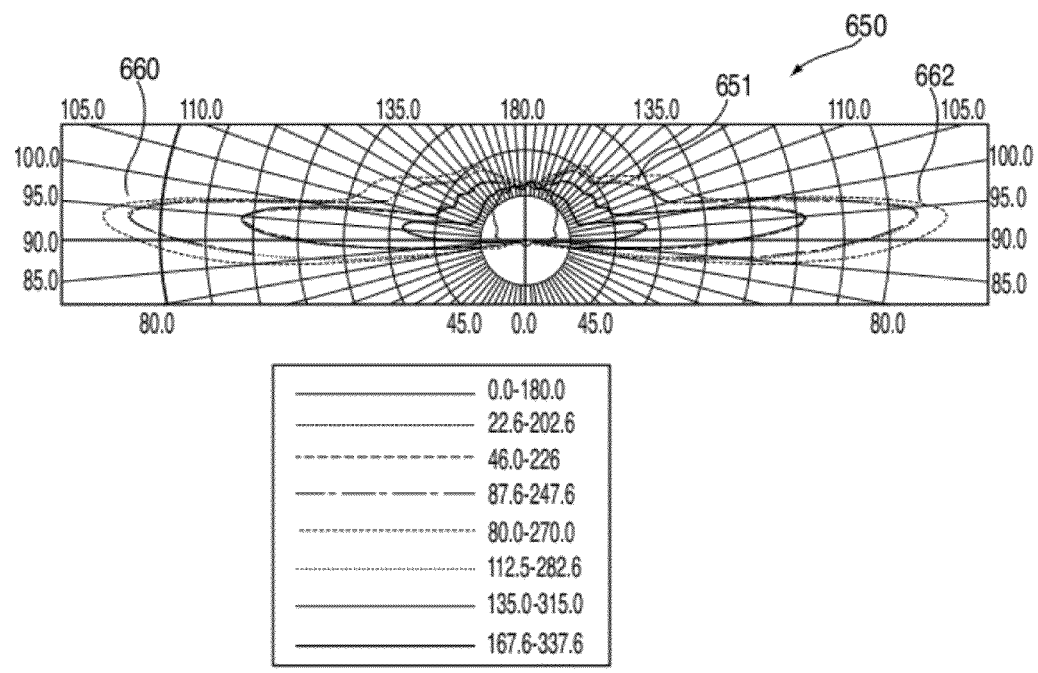
FIG. 6C is a graph of an illustrative light distribution provided using the lens of FIG. 6A in accordance with some embodiments of the invention.
Figure 6D:
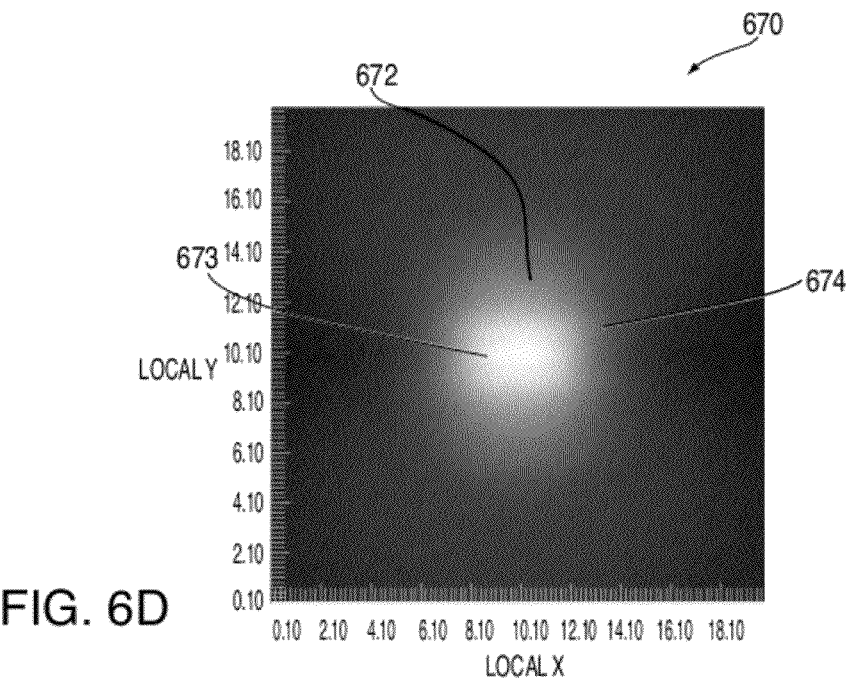
FIG. 6D is an image of an illustrative near field rendering of light provided on a ceiling by a light source using the lens of FIG. 6A in accordance with some embodiments of the invention.
Figure 6E:
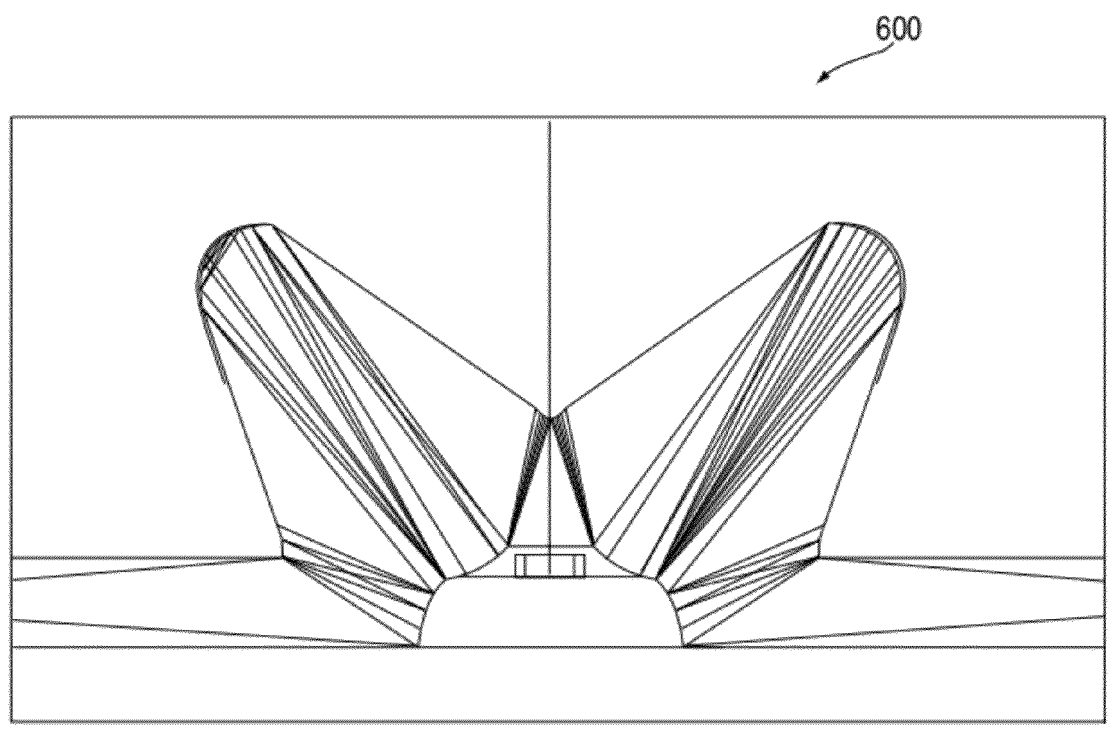
FIG. 6E is a sectional view of the lens of FIG. 6A in accordance with some embodiments of the invention.

FIG. 6A is a perspective view of another illustrative lens in accordance with some embodiments of the invention, and FIGS. 6B and 6E are sectional views of the lens of FIG. 6A in accordance with some embodiments of the invention. Lens 600 can include plate elements 632 and 634 extending from knobs 640 and 642. The lens can have a substantially rectangular shape, where knobs 640 and 642 extend substantially along a long axis of the lens. The external surface of knobs 640 and 642 can serve as a secondary lens surface for lens 600. Lens 600 can include trench 636, which provides a primary lens surface for lens 600, extending between plate elements 632 and 634 for receiving a light source, similar to the corresponding components of lens 400 (FIGS. 4A and 4B) and 500 (FIGS. 5A and 5B). In some cases, lens 600 can include caps at each end of trench 636 to prevent light from leaking out through the ends of the lens and adversely affecting the optical performance of the lens.

Knobs 640 and 642 can have any suitable feature for directing light in a desired manner. For example, knobs 640 and 642 can include ear-like shapes for re-directing light emitted by a light source. In particular, light emitted by a light source can be distributed in a manner depicted by curve 651 of graph 650, shown in FIG. 6C. Curve 651 can include distinct peaks 660 and 662, each corresponding to knobs 640 and 642, respectively, angled away from axis vertical to the light emitting surface of the light source. Representation 670, shown in FIG. 6D, depicts a near field rendering of light provided on a ceiling by a light source using lens 600. Representation 670 can include central light region 672 having a periphery 674. Due to the shape of lens 600, however, a gradient of light between center 673 of central light region 672 and periphery 674 can be substantially continuous, to correspond to target representation 370 (FIG. 3).

Figure 7:
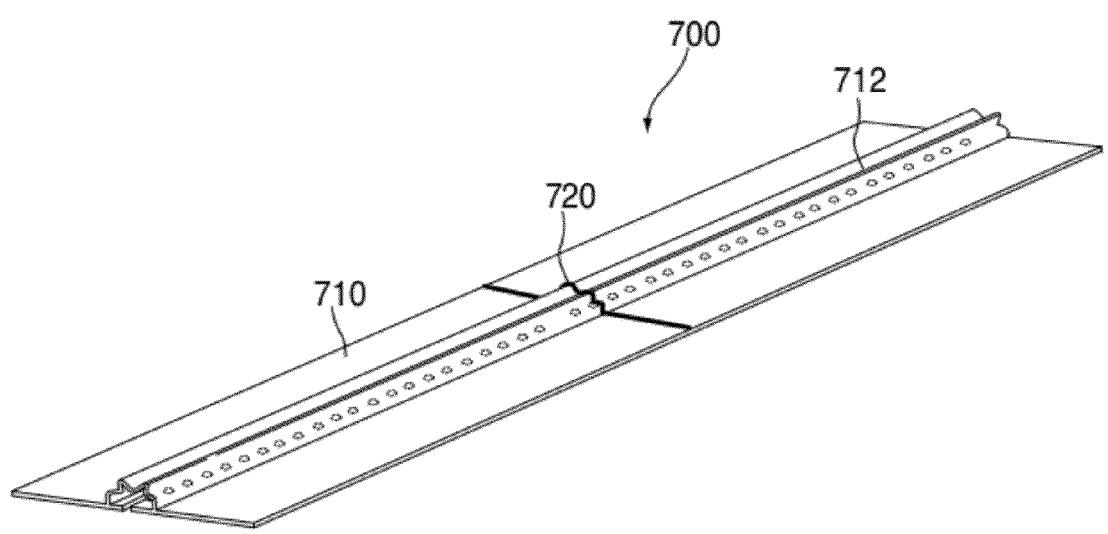
FIG. 7 is a perspective view of an illustrative lens constructed from several modules in accordance with some embodiments of the invention.

A lens of the design described above in connection with FIGS. 3-6 can be constructed using different approaches. In some embodiments, a lens can be constructed as an integral element of a selected length. For example, a lens can be constructed as a single component having a size corresponding to a size of a fixture. Alternatively, each lens can be constructed using a modular approach. For example, several lens having pre-determined lengths can be constructed independently, and mounted in sequence within a fixture. FIG. 7 is a perspective view of an illustrative lens constructed from several modules in accordance with some embodiments of the invention. Lens 700 can include lens modules 710 and 712 positioned such that features of each module (e.g., knobs and trenches) remain aligned to provide a continuous path for light emitted by a light source. In some cases, lens 700 can include a gasket 720 or other connector at the interface between the lens modules to ensure that stray light does not pass through the interface between the modules. In some cases, each module can include an interlocking feature at each end of the module to ensure that adjacent modules overlap and prevent the transmission of stray light. In some cases, the end of each lens module can be shaped in a manner that accounts for or takes advantage of thermal expansion.

In some cases, a lens can include several protrusions and trenches in parallel or at angles relative to one another. Alternatively, several lenses can be placed parallel to each other to form a wide angle panel of light.

The lens, or lens modules, can be constructed from any suitable material. For example, an acrylic, polycarbonate, glass, or other plastic material having desired optical properties can be selected. In some cases, several different materials can be used, for example for different portions of the lens. The materials used can be selected to provide a particular amount of transmitted light in addition directing a maximum intensity of light in a particular orientation.

In some cases, an outer surface of the lens can be roughened to create a diffusive layer. For example, the outer surface of the extruded lens can be roughened using a machining process. Alternatively, additional material forming a diffusive layer can be deposited on the outer surface of the lens. In some cases, the lens can include secondary optics for adjusting the optical performance of the lens. In particular, a metallic coating or a reflector can be used to enhance the visual appeal of a fixture using the lens, or to minimize unwanted radiation in specific directions (e.g., normal to a light emitting surface of the light source).

Any suitable light source used can be used for a lens constructed as described above. In some cases, a LED module powered by low voltage DC power can be used. In particular, a series of LED modules or packages, provided in a line so as to fit within a trench of the lens, can be powered using constant current. The power provided can include, for example, 3.2 volts per LED module or LED package, so that 6-10 modules or packages require 19.2-32 volts. In some cases, power with a higher voltage (e.g., 3.5 volts/package) can be used, or a different number of modules can be used (e.g., 20 modules). In some cases, the total voltage applied to the modules or packages can be at most 60 volts. In some cases, the drive current used for the LED module can vary based on a power rating of the LED module.

Because of the elongated shape of the lens, and the constant cross-section, the lens can be easily constructed using an extrusion process. For example, acrylic material can be heated and pressed through a die corresponding to the lens. Once the material passes through the die, the material can be cooled to form the lens. If the trench of the lens includes a bend or other variation in cross-section (e.g., a square-shaped lens), several modules can be individual extruded, and subsequently combined to form the lens.

Figure 8:
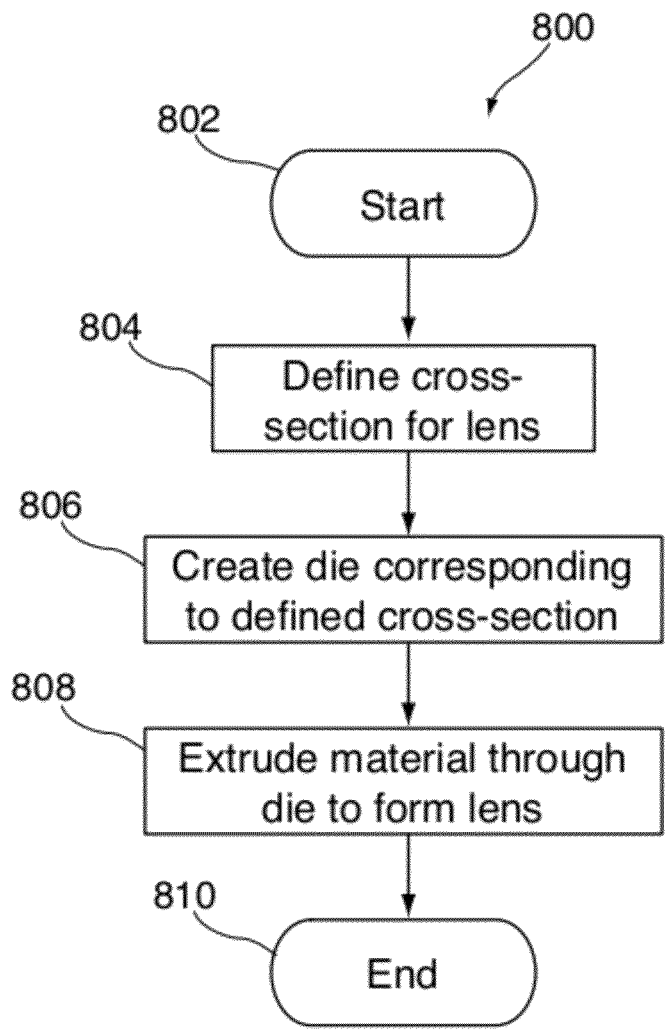
FIG. 8 is a flow chart of an illustrative process for constructing a lens for use with a like fixture including a LED module in accordance with some embodiments of the invention.

FIG. 8 is a flow chart of an illustrative process for constructing a lens for use with a like fixture including a LED module in accordance with some embodiments of the invention. Process 800 can begin at step 802. At step 804, a cross-section for a lens can be defined. For example, a lens having a body (e.g., one or more plate elements, knobs or other protrusions) and a trench extending through the body can be defined. In some cases, the dimensions and shapes of portions of the lens can be selected such that light emitted by a LED module placed in the trench of the lens can be directed at an angle of approximately 105 degrees from a normal to a light emitting surface of the LED module. At step 806, a die corresponding to the defined cross-section can be created. The die can be constructed from any suitable material including, for example, a material having a higher melting temperature than the material used for the lens. At step 808, a lens material (e.g., acrylic) can be extruded through the die to form the lens. In some cases, the lens can be constructed to have a specific length determined from requirements of a fixture. Alternatively, the lens length can be one or more pre-defined modular lengths. Process 800 can then end at step 810.

It is to be understood that the steps shown in process 800 of FIG. 8 are merely illustrative and that existing steps may be modified or omitted, additional steps may be added, and the order of certain steps may be altered. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A light fixture, comprising:
   a LED module comprising a plurality of LED packages disposed substantially along an axis, wherein the LED module comprises a light emitting surface; and
   a lens comprising:
      an elongated body; and
      a trench extending through the elongated body and providing a primary lens surface, wherein the LED module is operative to be received in the trench, and wherein a maximum light intensity emitted by the LED module is distributed by the lens at an angle less than 110 degrees from a nadir orientation to the light emitting surface.

2. The light fixture of claim 1, further comprising:
   a fixture comprising a plate and side walls extending from the plate, the plate defining a top surface and a bottom surface, wherein the lens is placed adjacent to the top surface of the plate.

3. The light fixture of claim 2, wherein: the fixture further comprise a notch extending between the side walls and the top surface of the plate, wherein a portion of the lens is operative to engage the notch.

4. The light fixture of claim 2, wherein: the fixture is operative to be hung from a ceiling.

5. The light fixture of claim 1, wherein the elongated body further comprises: a first plate and a second plate positioned on opposite sides of the trench; and a protrusion coupled to and extending from the first plate and the second plate, wherein the protrusion is operative to distribute light emitted by the LED module.

6. The light fixture of claim 5, wherein: the trench extends at least partially through the protrusion.

7. The light fixture of claim 5, wherein the protrusion comprises: a first knob extending from the first plate; and a second knob extending from the second plate, wherein the first and second knob connect near a centerline of the LED module.

8. The light fixture of claim 7, wherein: the protrusion comprises an indentation at an interface between the first knob and the second knob on an outer surface of the protrusion.

9. The light fixture of claim 5, wherein: the lens is constructed using an extrusion process.

10. A wide-angle lens for use with a LED light source, comprising:
   a first plate; a second plate positioned adjacent to and offset from the first plate, wherein the first and second plates are co-planar; and
   a protrusion coupling the first plate to the second plate, wherein the protrusion comprises:
      a trench separating the first plate from the second plate; and
      an indentation opposite to the trench, the protrusion is operative to re-direct light emitted at a small angle to a wide angle that is substantially equal to 105 degrees from a nadir orientation.

11. The wide-angle lens of claim 10, wherein: the protrusion is operative to direct light received from a normal to the plane of the first and second plates to a wide angle relative to the plane of the first and second plates.

12. The wide-angle lens of claim 10, wherein: the protrusion comprises a first knob positioned adjacent to the first plate; and the protrusion comprises a second knob positioned adjacent to the second plate, wherein the trench extends into a portion of the first knob and into a portion of the second knob.

13. The wide-angle lens of claim 12, wherein: the first knob comprises a first peak extending away from the first plate; and the second knob comprises a second peak extending away from the second plate.

14. The wide-angle lens of claim 10, wherein: the lens is symmetrical relative to a plane extending through a center of the trench.

* * * * *